US006318669B1

United States Patent
Dazet et al.

(10) Patent No.: US 6,318,669 B1
(45) Date of Patent: Nov. 20, 2001

(54) AIRCRAFT COMPRISING A LANDING GEAR WITH CONTROLLED DETACHMENT IN THE EVENT OF AN ACCIDENT

(75) Inventors: Francis Dazet, Saint Albau; André Maurin, Toulouse, both of (FR)

(73) Assignee: Aerospatiale Airbus, Paris (FR)

( * ) Notice: Subject to any disclaimer, the term of this patent is extended or adjusted under 35 U.S.C. 154(b) by 0 days.

(21) Appl. No.: 09/577,886

(22) Filed: May 25, 2000

(30) Foreign Application Priority Data

Jun. 15, 1999 (FR) .................................................. 99 07544

(51) Int. Cl.[7] .................................................. B64C 25/00
(52) U.S. Cl. ................................ 244/100 R; 244/102 R; 244/121
(58) Field of Search ....................... 244/50, 100 R, 244/102 R, 104 R, 104 FP, 121, 135 R

(56) References Cited

U.S. PATENT DOCUMENTS

| 4,087,062 | * | 5/1978 | Masclet | 244/100 R |
| 4,155,522 | | 5/1979 | Sealey . | |
| 4,392,622 | * | 7/1983 | McClaflin | 244/102 R |
| 4,408,736 | * | 10/1983 | Kirschbaum et al. | 244/100 R |
| 5,333,816 | * | 8/1994 | Del Monte | 244/100 R |

* cited by examiner

Primary Examiner—Galen L. Barefoot
(74) Attorney, Agent, or Firm—Burns Doane Swecker & Mathis LLP

(57) ABSTRACT

On an aircraft, particularly of the commercial type, a landing gear (16) placed in front of a fuel tank (18) comprises a rod system (32) capable of coming into contact with a sliding rail (52) formed on a reinforced structural part (48) of the aircraft, in the event of accidental tilting of the gear to the rear. The deformation resulting from the rod system (32) then successively induces the complete slackening of the damper (24) of the gear, the rupture of its slack limit stop (25), followed by the rupture of a part of the rod system (32). The lower part of the gear (16) is then ejected and guided by a rear part (52b) of the sliding rail (52), with no risk of perforation of the tank (18).

9 Claims, 5 Drawing Sheets

AIRCRAFT COMPRISING A LANDING GEAR WITH CONTROLLED DETACHMENT IN THE EVENT OF AN ACCIDENT

FIELD OF THE INVENTION

The invention relates to an aircraft equipped with a landing gear designed to be able to be detached in a controlled manner, in the event of an accident. The invention particularly makes it possible to prevent the extracted landing gear from striking a fuel tank placed behind it.

The invention particularly relates to a commercial type aircraft, such as an aircraft intended for passenger and/or freight transport.

STATE OF THE RELATED ART

In commercial aircraft, the fuel tanks are generally located in the wing unit and in the lower part of the fuselage section holding the wing unit, in front of the main landing gear. This central and symmetrical position of the tanks with reference to the median longitudinal plane of the aircraft makes it possible to manage its centring easily. In other words, the position of the centre of gravity of the aircraft is only slightly modified by the decrease in the weight of the fuel that occurs as it is burned in the engines.

In order to increase the capacity and flying range of an aircraft, it may be necessary to modify it and design a new version, without, however, modifying its essential characteristics. Indeed, this makes it possible to use the highest possible number of common parts on the different versions of the same aircraft.

Consequently, a new version of an existing aircraft, characterised by an increased capacity and flying range with reference to the basic version, may be defined without the wing unit and the section holding it in place being modified. Under these conditions, the fuel tanks contained in the wing unit and in this section are not modified either, so that their capacity remains unchanged. In order to enable the aircraft to complete its new task, which implies having an additional quantity of fuel so as to increase its flying range, an additional fuel tank must then be added. An appropriate position for this additional tank is located in the lower part of the fuselage, behind the main landing gear. Indeed, this position located in a central part of the aircraft enables good management of the longitudinal position of its centre of gravity.

However, this additional fuel tank position may prove to be critical under abnormal landing or takeoff conditions.

The applicable regulations stipulate that landing gear failure and its consequences under abnormal conditions must be taken into consideration. They also require a limitation of fuel leakages. Under these conditions, it is necessary to prevent any impact between the ruptured landing gear and the walls of the fuel tank, which could result in the perforation of said tank; this involves controlling the rupture of the landing gear and the trajectory of its parts that are detached.

On aircraft, there is a comparable risk near the reactors. Indeed, behind the combustion chamber of each of the reactors, there is a turbine, with blades that are heated to very high temperatures. In the event of the rupture of a blade, it is therefore essential it never encounters on its trajectory vital components for the control of the aircraft, such as flight controls, hydraulic circuits, etc., or fuel. For fuel, the solution currently used consists of limiting the quantity of fuel present in the probable ejection cone of a blade to the lowest possible value.

However, this solution cannot be transposed in the case of a fuel tank placed behind the main landing gear of the aircraft. Indeed, for the reasons mentioned above, this position offers essential advantages determining its choice, when an additional tank is to be fitted on the aircraft.

DISCLOSURE OF THE INVENTION

The invention relates to an aircraft equipped with a landing gear, the original design of which enables its detachment to be controlled, particularly in order to eliminate any risk of impact between the detached part of the landing gear and the structure of the aircraft, under abnormal landing or takeoff conditions.

According to the invention, this result is obtained by means of an aircraft, comprising a structure and at least one landing gear fitted under the structure, the landing gear comprising a frame, a bogie, a damper equipped with a slack limit stop and a rod system placed behind the damper, the damper and the rod system connecting the bogie to the frame separately, characterised in that the structure comprises a sliding rail with which the rod system can come into contact, in the event of accidental tilting of the landing gear to the rear, to induce a complete slackening of the damper, a rupture of the slack limit stop and a rupture of the rod system successively.

In this way, in the event of an incident resulting in the tilting of the landing gear to the rear, the slack limit stop of the damper and the rod system both connecting to the bogie the frame are ruptured automatically. The two part of the damper connected to the bogie and the frame, respectively, are then separated from each other under the combined effect of the movement of the aircraft and the residual pressure in the damper, by applying a reasonable level of force to the fuselage. Consequently, the bogie is extracted automatically with no risk of impact. If a fuel tank is placed in the aircraft structure, above the sliding rail, complete destruction of the aircraft due to an explosion of the fuel leaking from the tank is thus prevented.

Preferably, the rod system comprises two arms connected end to end by a joint capable of coming into contact with the sliding rail in the event of accidental tilting of the landing gear to the rear.

In a preferred embodiment of the invention, the joint comprises a rupture control stop, capable of controlling the rupture of a part of the rod system when an angle formed between the two arms reaches a predetermined maximum value.

Depending on the case, the part capable of being ruptured may then be either one of the arms of the rod system, for which a zone is dimensioned so as to enable rupture by bending, or the joint shaft, dimensioned so as to enable rupture by shearing.

Advantageously, one of the arms of the rod system, articulated on the bogie, comprises a stop capable of coming into contact with the damper, after the rupture of the rod system.

Moreover, the sliding rail is formed, preferably, on a reinforced structural part.

In a preferred embodiment of the invention, the sliding rail comprises a first part, capable of controlling successively the rupture of the slack limit stop of the damper and the rupture of the rod system, and a second part, capable of guiding a detached part of the landing gear away from said structural part of the aircraft.

BRIEF DESCRIPTION OF FIGURES

We will now describe, as non-restrictive examples, two preferred embodiments of the invention, referring to the appended Figures, wherein.

DETAILED DESCRIPTION OF TWO PREFERRED EMBODIMENTS OF THE INVENTION

Figure 1:
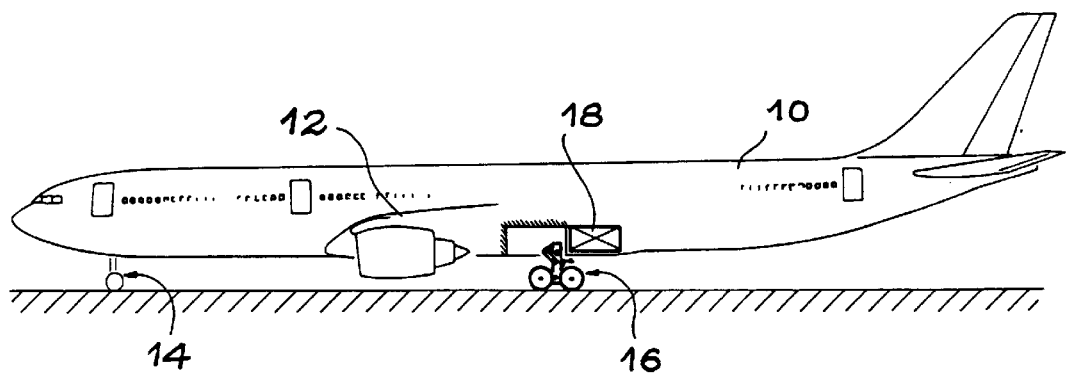
FIG. 1 is a side view representing an aircraft according to the invention schematically.

FIG. 1 represents an aircraft according to the invention schematically. This aircraft is a commercial aircraft, of a conventional general design, intended for passenger and/or freight transport. Only the characteristics required for a good understanding of the invention will be described below.

The structure of the aircraft particularly comprises, as a general rule, a fuselage 10 and a wing unit 12. When the aircraft is not flying, this structure is supported on the ground with a front landing gear 14 and a main landing gear. The latter comprises an auxiliary gear part 16 fitted under the fuselage 10, which is added to the gear parts fitted under the wing unit 12. For simplification purposes, the expression "landing gear" is used throughout the text to refer to each gear part.

Also as a general rule, the aircraft is equipped with fuel tanks (not shown) fitted in the wing unit 12 and in the lower part of the fuselage section 10 supporting said wing unit. This section is placed at the front of the landing gear 16 fitted under the fuselage.

In the embodiment represented, an additional tank 18 is also fitted in the lower part of the fuselage 10, in a section of said fuselage located immediately behind the landing gear 16. The layout according to the invention is particularly advantageous in the presence of such an additional tank. However, it may also be used when such a tank is not present on the aircraft.

For accidental reasons such as the presence of an obstacle on the runway during the running of the aircraft, tilting of the landing gear 16 to the rear cannot be totally excluded. According to the invention, the landing gear 16 is designed and produced so that the occurrence of such as accident will not induce an impact, and the perforation of the tank 18 when such a tank exists.

A first preferred embodiment of the invention making it possible to achieve this result will now be described referring to FIGS. 2, 3 and 4A to 4C. The description relates to the extended gear status.

Figure 2:
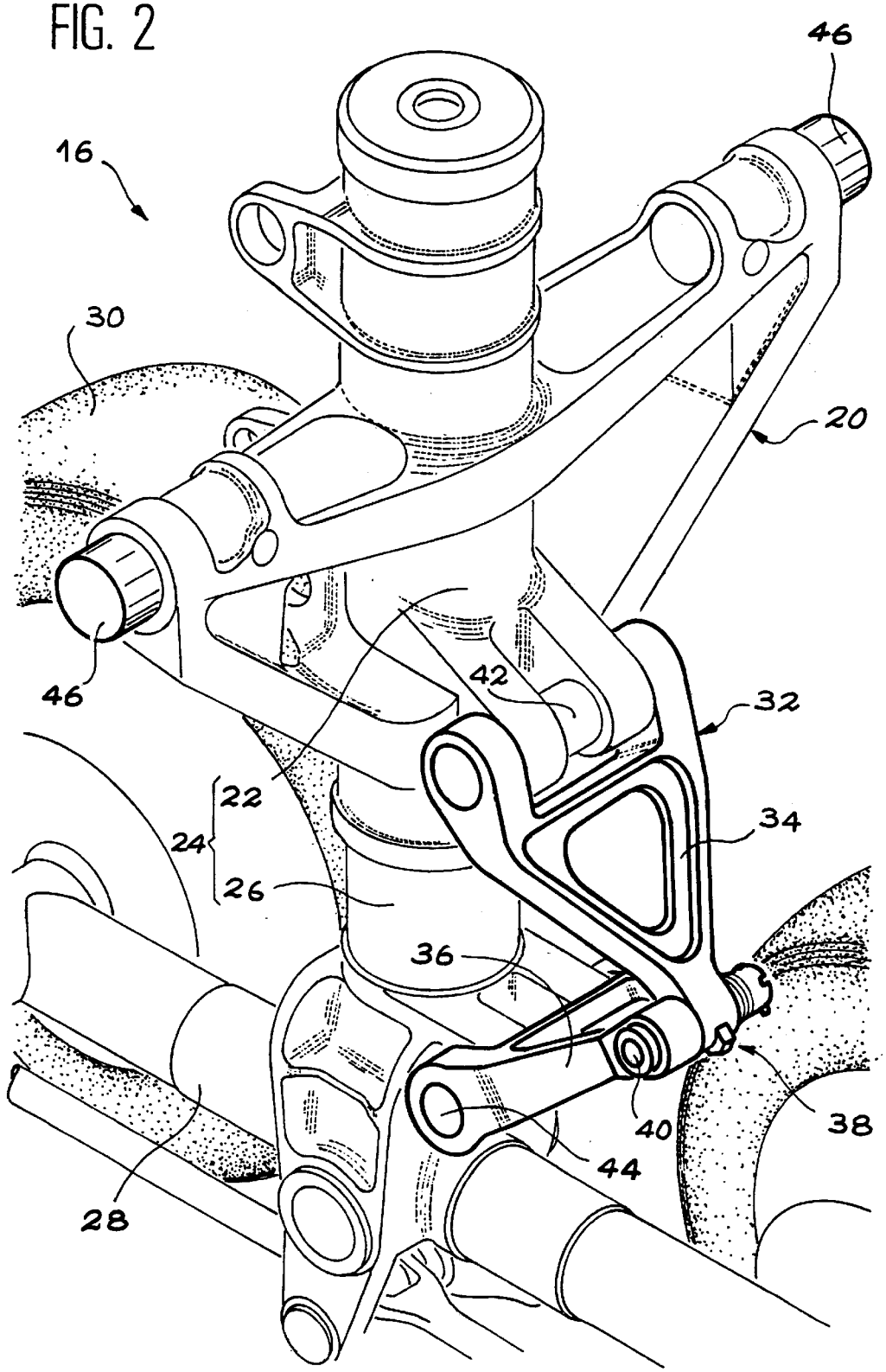
FIG. 2 is a perspective view representing a main landing gear of the aircraft in FIG. 1, observed from the rear, produced according to a first embodiment of the invention.

As illustrated in FIG. 2, the landing gear 16 comprises a frame 20, produced in one piece with a vertical cylinder 22 forming the fixed upper cylinder of a main damper 24. A tube 26, forming the mobile lower part of the damper 24, has a bogie 28 at its lower end. Each of the front and rear ends of the bogie 28 in turn support the axle stub of a pair of wheels 30 fitted in dolly axles, and in which brakes (not shown) are housed.

A rod system 32, generally referred to as "torque links" is inserted between the cylinder 22 and the tube 26 of the damper 24. This rod system 32 is placed behind the damper 24 in the direction of the movement of the aircraft. It comprises a first arm 34 and a second arm 36, connected end to end by a joint 38 the shaft 40 of which is oriented transversally with reference to the aircraft, i.e. parallel to the axes of the wheels 30.

The upper end of the first end 34, opposite the joint 38, is mounted pivoting on the cylinder 22 by a shaft 42. Comparably, the lower end of the second arm 36, opposite the joint 38, is mounted pivoting on the tube 26 by a shaft 44. The shafts 42 and 44 are oriented transversally and parallel to the shaft 40.

The mechanism performing the extension and retraction control of the landing gear 16 was voluntarily omitted from FIG. 2, for easier reading.

The frame 20 of the landing gear 16 is connected to the structure of the aircraft, more specifically in this case to the fuselage 10, by two aligned shafts 46 projecting from either end of the frame 20, in order to be received in complementary cylindrical housings (not shown) provided for this purpose in the structure of the fuselage 10. The shafts 46 are oriented transversally, i.e. parallel to the shafts 40, 42 and 44.

Figure 4:
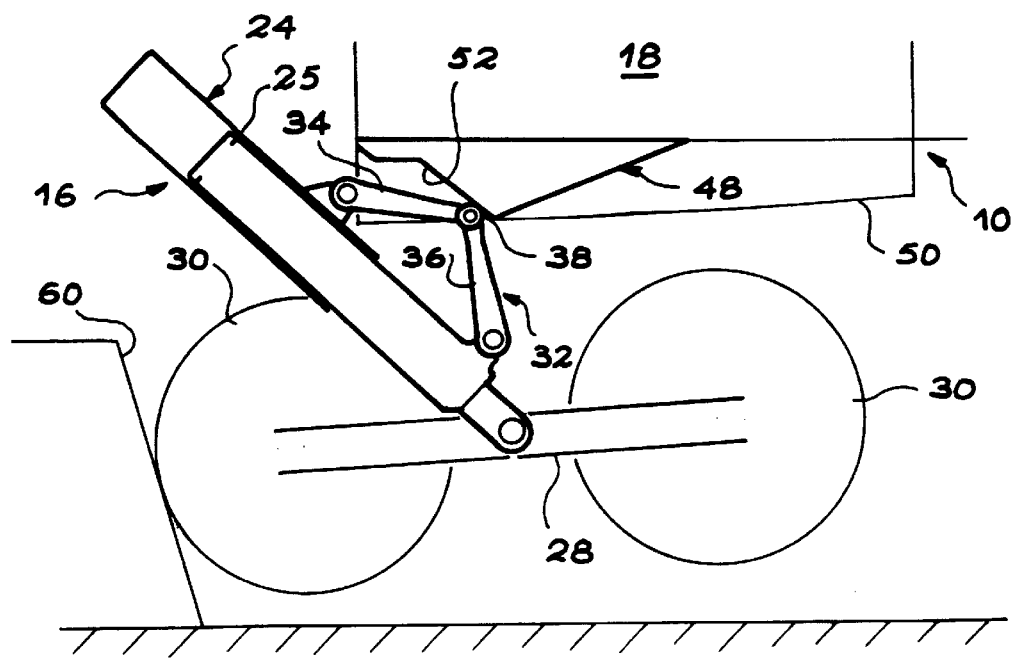
FIGS. 4A to 4C are side views representing the landing gear in FIG. 2 and the adjoining parts of the aircraft schematically in three successive statuses of the gear, during its accidental tilting to the rear.
Figure 4:
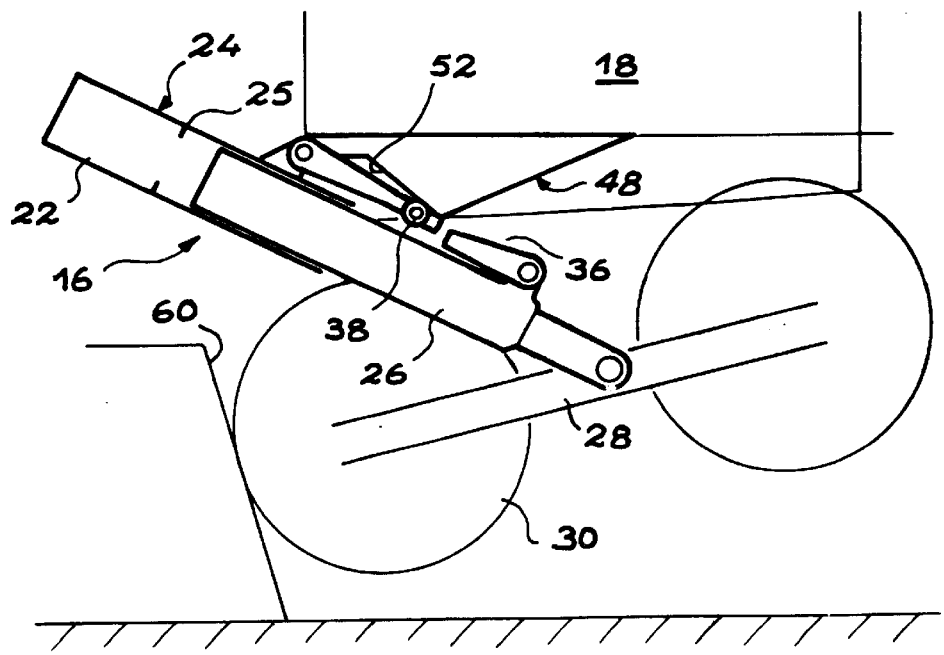
Figure 4C:
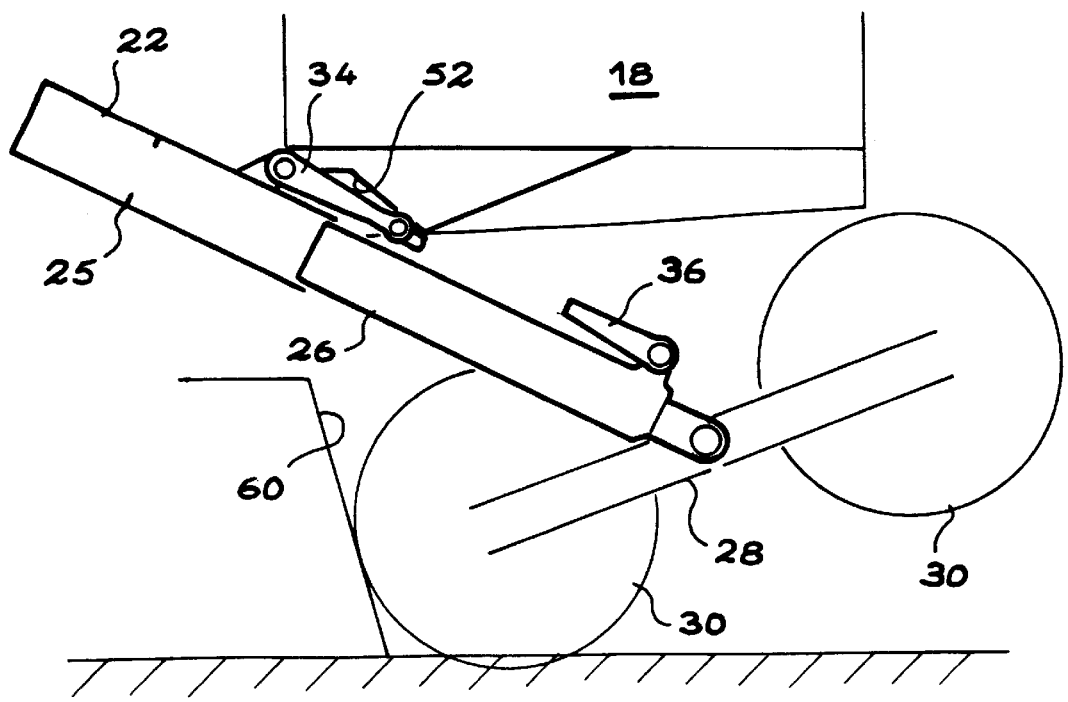

As shown more precisely in FIGS. 4A to 4C, the fuselage 10 of the aircraft comprises, under the front part of the fuel tank 18, a reinforced structural part 48. This part 48 is placed inside the outer shell 50 of the fuselage 10, in a position such that the joint 38 of the rod system 32 automatically strikes it, in the event of accidental tilting of the landing gear 16 to the rear. More precisely, the joint 38 strikes a sliding rail 52 turning downwards provided on the structural part 48. The joint 38 slides against the sliding rail 52, in this case, inclined to the rear and downwards, in the event of accidental tilting of the gear to the rear, as illustrated schematically in FIGS. 4A to 4C. As a variant, the sliding rail 52 may also be inclined upwards, or horizontal.

According to the invention, the rod system 32 is designed so as to be ruptured automatically when the angle formed between the two arms 34, 36 reaches a predetermined maximum value. This value can only be reached when the damper 24 is completely slack and when a slack limit stop 25 of the damper is already ruptured. These successive ruptures follow the contact of the joint 38 of the rod system 32 with the sliding rail 52, in the event of accidental tilting of the landing gear 16 to the rear.

Figure 3:
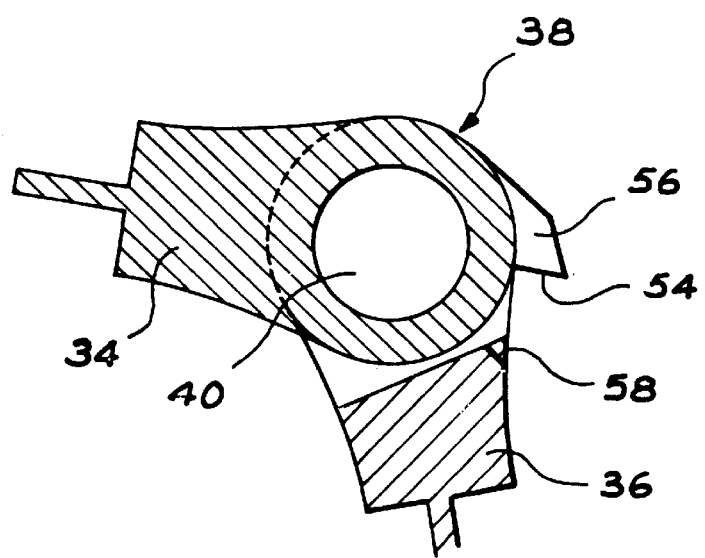
FIG. 3 is a transversal section view, at a larger scale, of the joint of the rod system of the landing gear illustrated in FIG. 2.

As illustrated more precisely in FIG. 3, the rupture of a part of the rod system 32, above the predetermined maximum value of the angle formed between the arms 34 and 36, is controlled by a rupture control stop 54, formed by a pin 56 attached to the end of the first arm 34 connected to the second arm 36 by the joint 38. The stop 54 is placed in the extension of the first arm 34 and turning towards a surface 58 opposite the second arm 36.

Under the normal extension conditions of the damper 24, the arms 34 and 36 form an angle with each other such that the stop 54 remains at a distance from the surface 58 formed by the second arm 36. Consequently, the stop 54 does not fulfil any function during a normal, even abrupt, landing of the aircraft.

When the landing gear 16 pivots to the rear, under the effect of accidental circumstances, until the joint 38 of the rod system 32 comes into contact with the sliding rail 52, the angle formed between the arms 34 and 36 increases progressively. The damper 24 then becomes completely slack and its slack limit stop 25 is ruptured.

If the pivoting of the landing gear 16 continues until the stop 54 comes into contact with the surface 58 formed on the second arm 36, any additional pivoting of the landing gear 16 (corresponding to an additional extension of the damper 24) generates in the rod system 32 characteristic strains to ensure its rupture.

More precisely, the location of the rod system 32 on which the rupture takes place is, preferably, determined in advance, by dimensioning one of the parts of this rod system so that it is ruptured automatically when an excessive strain is applied on it.

In the first embodiment of the invention, the part to be ruptured is the arm 36. This arm comprises, in this case, a zone dimensioned to enable rupture by bending, near the joint 38. As a variant, the rupture may also occur in the arm 34.

We will now describe, referring in particular to FIGS. 4A to 4C, the consequences of accidental running of an aircraft produced in this way, when this running generates tilting to the rear of the landing gear 16 under conditions liable to threaten the integrity of the fuel tank 18, when such a tank is provided.

For example, due to an obstacle 60 placed in the path of the wheels 30 of the landing gear 16, said landing gear tilts to the rear around the pivoting axis represented by the shafts 46 (FIG. 2). When this tilting results in the joint 38 of the rod system 32 coming into contact with the sliding rail 52 as illustrated in FIG. 4A, the joint 38 slides against it. This results in a complete slackening of the damper 24, followed by a rupture of the slack limit stop 25 of the damper 24. The tilting of the gear also results in a progressive opening of the angle formed between the arms 34 and 36.

The stop 54 then comes into contact with the surface 58 of the arm 36, so that the continued tilting of the gear 16 results in the rupture of the arm 36 by bending, near the joint 38. When the two arms are extended from each other as illustrated in FIG. 4B, they are therefore no longer connected to each other and the tube 26 is separated from the cylinder 22.

Under these conditions, the movement of the aircraft that continues, combined with the action of the pressure present inside the damper 24, tend to eject the lower part of the landing gear 16, i.e. the assembly composed of the tube 26, the arm 36, the bogie 28, the wheels 30 and their associated brakes. As illustrated in FIG. 4C, this ejection is performed without damaging the fuel tank 18 if present and, consequently, with no risk for the integrity of the aircraft.

Figure 5A:
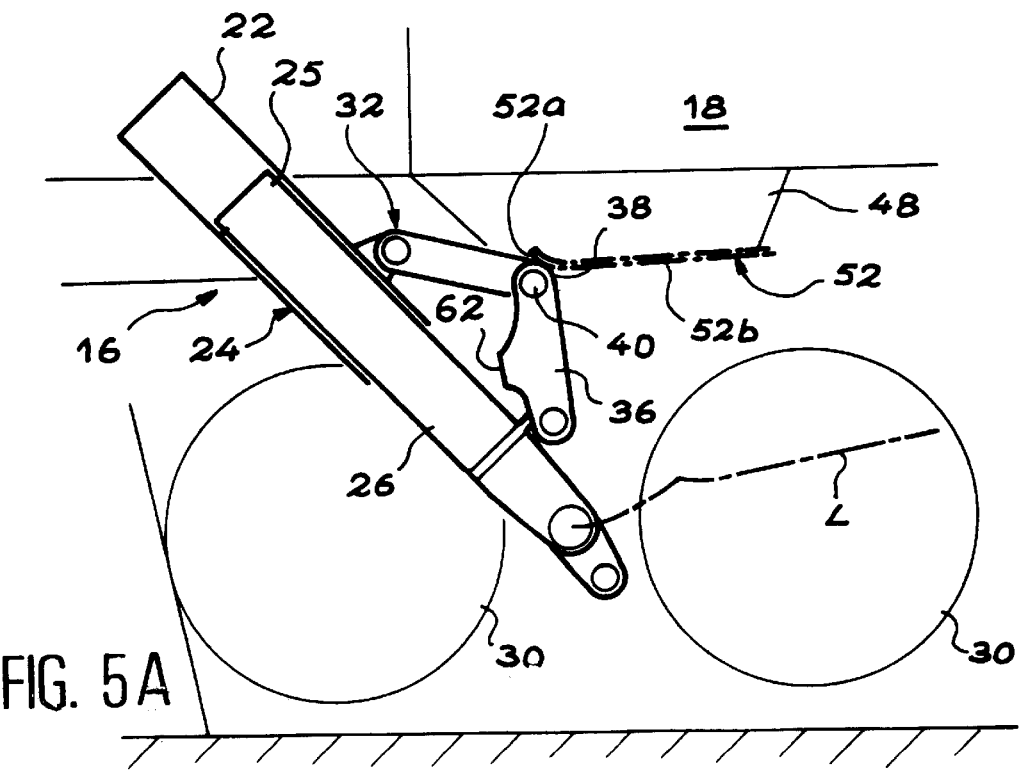
FIGS. 5A to 5C are views comparable to FIGS. 4A to 4C, illustrating another embodiment of the invention.
Figure 5B:
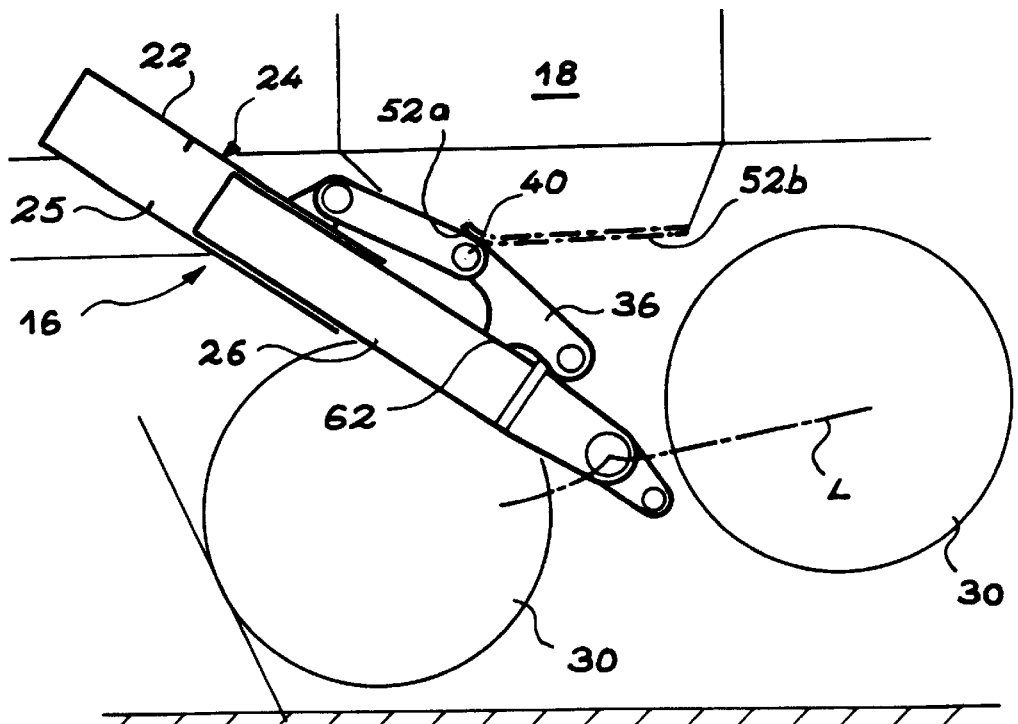
Figure 5C:
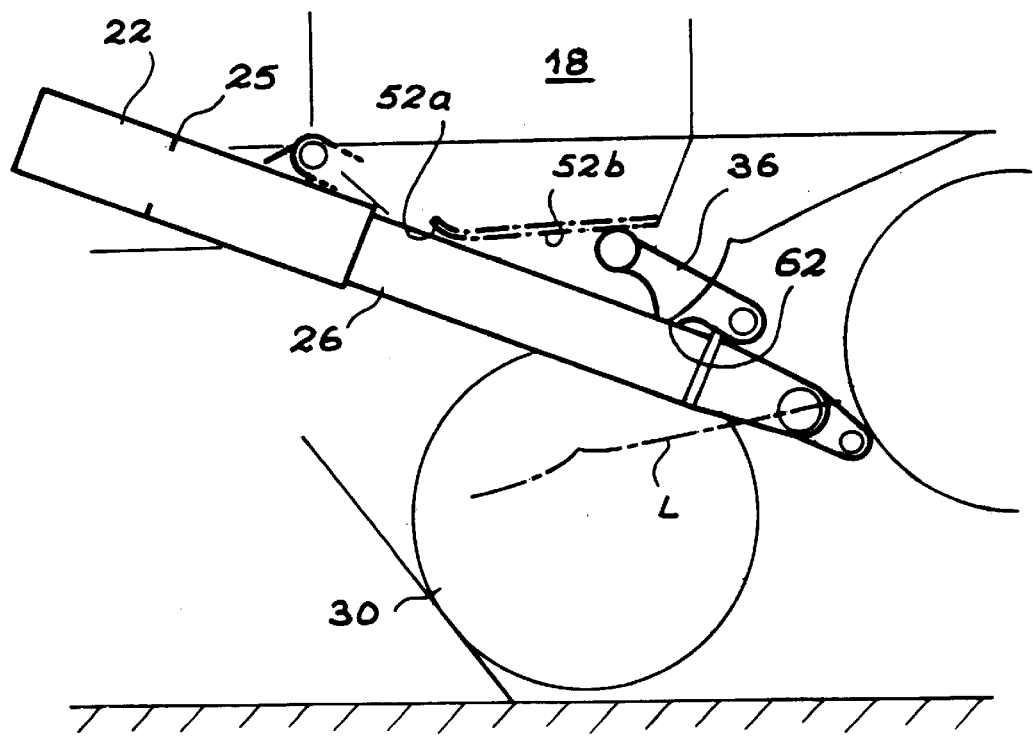

FIGS. 5A to 5C illustrate a second embodiment of the invention, in the event of the occurrence of accidental tilting of the landing gear 16 to the rear. The difference between this embodiment and the previous embodiment essentially lies in the nature of the part of the rod system 32 ruptured in the event of an accident, and in the shape of the sliding rail 52.

In this way, in the case of FIGS. 5A to 5C, the rupture of the rod system 32 occurs on the shaft 40, under the effect of the shearing strains applied when the predetermined maximum value of the angle separating the arms 34 and 36 is reached. These strains are applied, as above, due to a layout as illustrated in FIG. 3. In this case, the shaft 40 is dimensioned so as to be ruptured by shearing under such accidental conditions, while being capable of withstanding the strains normally applied under the most severe landing conditions.

The second embodiment of the invention illustrated in FIGS. 5A to 5C is also differentiated from the previous embodiment by the shape of the sliding rail 52 provided on the reinforced structural part 48.

In this way, the sliding rail 52 comprises a first part 52a, inclined (or not) to the rear (or to the front) and downwards (or upwards), with which the joint 38 of the rod system 32 automatically comes into contact in the event of accidental tilting of the landing gear 16 to the rear, as illustrated in FIG. 5A. The damper 24 then becomes slack and the slack limit stop 25 is ruptured.

The joint 38 then slides against said first part 52a of the sliding rail, until the rupture of the shaft 40 of the rod system 32, in a position shown in FIG. 5B.

The cumulative effects of the continued movement of the aircraft and the residual pressure present in the damper 24 then result in the ejection to the rear of the lower part of the landing gear 16, i.e. the tube 26, the arm 36, the bogie 28, the wheel 30 and their associated brakes. During this ejection, the upper end of the arm 36, initially integrated in the joint 38, is guided by a second part 52b, approximately horizontal, of the sliding rail, said second part 52b projecting from the part 52a to the rear, as shown in FIG. 5C.

As shown in FIGS. 5A, 5B and 5C, the arm 36 is equipped with a stop 62, turned towards the tube 26 of the damper. This stop 62 maintains a minimum distance between the tube 26 and the sliding rail 52 (FIGS. 5B and 5C), after the rupture of the shaft 40. This makes it possible to keep the detached part of the gear at a sufficient distance from the fuselage to prevent any impact.

In FIGS. 5A, 5B and 5C, a mixed line L illustrates the path followed by the joint connecting the tube 26 to the bogie of the gear, due to the guiding of the arm 36 by the sliding rail 52. This line clearly shows that any risk of perforation of the tank 18 by the ejected part of the gear 16 is prevented.

Naturally, the embodiments described above may undergo different variants, without leaving the scope of the invention. In this way, the control of the rupture of one of the parts of the rod system 32 may also be carried out by a stop integrated in either of the joints which connect the arm 34 to the cylinder 22 and the arm 36 to the tube 26, respectively. In addition, the two rupture modes of the rod system 32 may be combined with different possible embodiments of the sliding rail 52.

What is claimed is:

1. Aircraft, comprising a structure and at least one landing gear fitted under the structure, the landing gear comprising a frame, a bogie, a damper equipped with a slack limit stop and a rod system placed behind the damper, the damper and the rod system connecting the bogie to the frame separately, wherein the structure comprises a sliding rail with which the rod system can come into contact, in the event of accidental tilting of the landing gear to the rear, to induce successively a complete slackening of the damper, a rupture of the slack limit stop and a rupture of the rod system.

2. Aircraft according to claim 1, wherein the rod systems comprises two arms connected end to end by a joint capable of coming into contact with the sliding rail in the event of said accidental tilting of the landing gear to the rear.

3. Aircraft according to claim 2, wherein the joint comprises a rupture control stop, capable of controlling the rupture of a part of the rod system when an angle formed between the two arms reaches a predetermined maximum value.

4. Aircraft according to claim 3, wherein said part is one of the arms of the rod system, said arm comprising a zone dimensioned so as to enable rupture by bending.

5. Aircraft according to claim 3, wherein said part is a shaft of the joint, dimensioned so as to enable rupture by shearing.

6. Aircraft according to claim 2, wherein one of the arms, articulated on the bogie, comprises a stop capable of coming into contact with the damper, after the rupture of the rod system.

7. Aircraft according to claim 1, wherein the sliding rail is formed on a reinforced structural part.

8. Aircraft according to claim 1, wherein the sliding rail comprises a first part, capable of controlling the rupture of the slack limit stop of the damper and the rupture of the rod system successively, and a second part, capable of guiding a detached part of the landing gear away from said structural part of the aircraft.

9. Aircraft according to claim 1, wherein a fuel tank is placed in the structure of the aircraft, above the sliding rail.

* * * * *